(12) United States Patent
Li et al.

(10) Patent No.: US 11,106,859 B1
(45) Date of Patent: Aug. 31, 2021

(54) SYSTEMS AND METHODS FOR PAGE EMBEDDING GENERATION

(71) Applicant: Facebook, Inc., Menlo Park, CA (US)

(72) Inventors: Yixin Li, Kirkland, WA (US); Wenzhe Jiang, Seattle, WA (US); Jing He, Kirkland, WA (US); Jinyi Yao, Issaquah, WA (US)

(73) Assignee: Facebook, Inc., Menlo Park, CA (US)

( * ) Notice: Subject to any disclaimer, the term of this patent is extended or adjusted under 35 U.S.C. 154(b) by 51 days.

(21) Appl. No.: 16/018,848

(22) Filed: Jun. 26, 2018

(51) Int. Cl.
*G06F 40/134* (2020.01)
*G06Q 50/00* (2012.01)
*G06N 3/04* (2006.01)
*G06F 16/958* (2019.01)
*G06F 40/151* (2020.01)

(52) U.S. Cl.
CPC .......... *G06F 40/134* (2020.01); *G06F 16/986* (2019.01); *G06F 40/151* (2020.01); *G06N 3/04* (2013.01); *G06Q 50/01* (2013.01)

(58) Field of Classification Search
CPC ............. G06F 17/2235; G06F 17/2264; G06F 16/986; G06F 40/134; G06F 40/151; G06N 3/04; G06Q 50/01
USPC ........................................................ 715/234
See application file for complete search history.

(56) References Cited

U.S. PATENT DOCUMENTS

| | | | |
|---|---|---|---|
| 9,373,057 B1 * | 6/2016 | Erhan | G06K 9/6202 |
| 9,589,237 B1 * | 3/2017 | Qamar | G06Q 30/0631 |
| 10,402,750 B2 * | 9/2019 | Weston | G06N 3/08 |
| 2013/0073568 A1 * | 3/2013 | Federov | G06Q 30/0269 707/749 |
| 2014/0279773 A1 * | 9/2014 | Chen | G06F 16/353 706/20 |
| 2015/0293976 A1 * | 10/2015 | Guo | G06N 3/0454 707/706 |
| 2016/0110646 A1 * | 4/2016 | Somekh | G06N 5/04 706/46 |
| 2016/0188567 A1 * | 6/2016 | Pasternack | G06N 7/005 704/9 |
| 2016/0188592 A1 * | 6/2016 | Fergus | G06F 16/437 707/738 |
| 2016/0188724 A1 * | 6/2016 | Fergus | G06Q 50/01 707/738 |
| 2017/0052954 A1 * | 2/2017 | State | G06F 16/48 |
| 2017/0061294 A1 * | 3/2017 | Weston | G06F 16/334 |
| 2017/0193390 A1 * | 7/2017 | Weston | G06N 20/00 |
| 2017/0200063 A1 * | 7/2017 | Nariyambut Murali | G06K 9/4628 |
| 2017/0286867 A1 * | 10/2017 | Bell | G06N 3/0445 |
| 2017/0316311 A1 * | 11/2017 | Pilly | G06K 9/6249 |
| 2018/0096390 A1 * | 4/2018 | Hemmaplardh | G06Q 30/0255 |
| 2018/0174020 A1 * | 6/2018 | Wu | G06N 3/08 |

(Continued)

OTHER PUBLICATIONS

Adit Deshpande; A Beginner's Guide to Understanding Convolutional Neural Networks Part 2; Jul. 29, 2016; adeshpande3.github.io; pp. 1-12.*

*Primary Examiner* — Andrew R Dyer

(74) *Attorney, Agent, or Firm* — Sheppard Mullin Richter & Hampton LLP

(57) ABSTRACT

Systems, methods, and non-transitory computer readable media are configured to generate multiple channel embeddings for a page of a social networking system. The multiple channel embeddings can be mapped to a shared embedding space. A page embedding for the page of the social networking system can then be generated.

20 Claims, 7 Drawing Sheets

(56) References Cited

U.S. PATENT DOCUMENTS

| | | | | |
|---|---|---|---|---|
| 2018/0246972 A1* | 8/2018 | Shukla | ............... | G06F 16/9535 |
| 2018/0246973 A1* | 8/2018 | Zhao | ................... | G06F 16/9535 |
| 2018/0246974 A1* | 8/2018 | Shukla | ............... | G06F 16/9535 |
| 2018/0253496 A1* | 9/2018 | Natchu | ................ | G06F 16/951 |
| 2018/0285738 A1* | 10/2018 | Bouton | ................... | G06N 3/08 |
| 2018/0285774 A1* | 10/2018 | Soni | ...................... | G06N 3/084 |
| 2018/0356945 A1* | 12/2018 | Gannon | .......... | H04N 21/41407 |
| 2019/0098070 A1* | 3/2019 | Kim | ...................... | G02B 27/01 |
| 2019/0377825 A1* | 12/2019 | Chang | .................. | G06F 40/247 |

* cited by examiner

SYSTEMS AND METHODS FOR PAGE EMBEDDING GENERATION

FIELD OF THE INVENTION

The present technology relates to computerized social networking systems. More particularly, the present technology relates to techniques for generating page embeddings within computerized social networking systems.

BACKGROUND

Users often utilize computing devices for a wide variety of purposes. For example, users of a social networking system can use their computing devices to interact with one another, access content, share content, and create content. The users can also use their computing devices to access pages on the social networking system. The pages can be created by businesses, community organizations, public figures, and other entities. The social networking system can provide a large number of pages for a large number of entities. Accordingly, a user of the social networking system can have many choices in terms of pages to access.

SUMMARY

Various embodiments of the present technology can include systems, methods, and non-transitory computer readable media configured to generate multiple channel embeddings for a page of a social networking system. The multiple channel embeddings can be mapped to a shared embedding space. A page embedding for the page of the social networking system can then be generated.

In an embodiment, multiple embedding sequences can be generated. Each of the multiple embedding sequences can correspond to a channel.

In an embodiment, patterns can be detected in one or more of the multiple embedding sequences.

In an embodiment, the detecting the patterns in the one or more of the multiple embeddings sequences can comprise applying convolutional layers of a neural network.

In an embodiment, generating a channel embedding of the multiple channel embeddings can comprise performing a pooling on an embedding sequence.

In an embodiment, generating a channel embedding of the multiple channel embeddings can comprise performing a pooling on detected patterns.

In an embodiment, the mapping the multiple channel embeddings to the shared embedding space can comprise applying fully-connected layers of a neural network.

In an embodiment, the generating the page embedding for the page can comprise performing a pooling on the multiple channel embeddings as mapped to the shared embedding space.

In an embodiment, a loss value can be determined from two similarity values.

In an embodiment, weights of a neural network can be updated based on the loss value.

In an embodiment, multiple channels can be extracted from the page of the social networking system.

In an embodiment, the multiple channels can be of multiple channel types, and the multiple channel types can include one or more of page name, page description, page categories, page hashtags, or page topics.

In an embodiment, the extracting the multiple channels from the page of the social networking system can comprise providing, to a machine learning model, images from the page of the social networking system. Further, hashtags can be received from the machine learning model.

In an embodiment, the extracting the multiple channels from the page of the social networking system can comprise providing posts from the page of the social networking system to a machine learning model. Further, topics can be received from the machine learning model.

In an embodiment, an instance of training data can be accessed. The instance of training data can specify a first page of the social networking system, a second page of the social networking system, and a third page of the social networking system.

In an embodiment, the second page of the social networking system can be liked by users of the social networking system who liked the first page of the social networking system.

In an embodiment, a similarity value can be determined for a page embedding of the first page of the social networking system and a page embedding of the second page of the social networking system.

In an embodiment, a similarity value can be determined for a page embedding of the first page of the social networking system and a page embedding of the third page of the social networking system. The third page of the social networking system can be a randomly-selected page.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
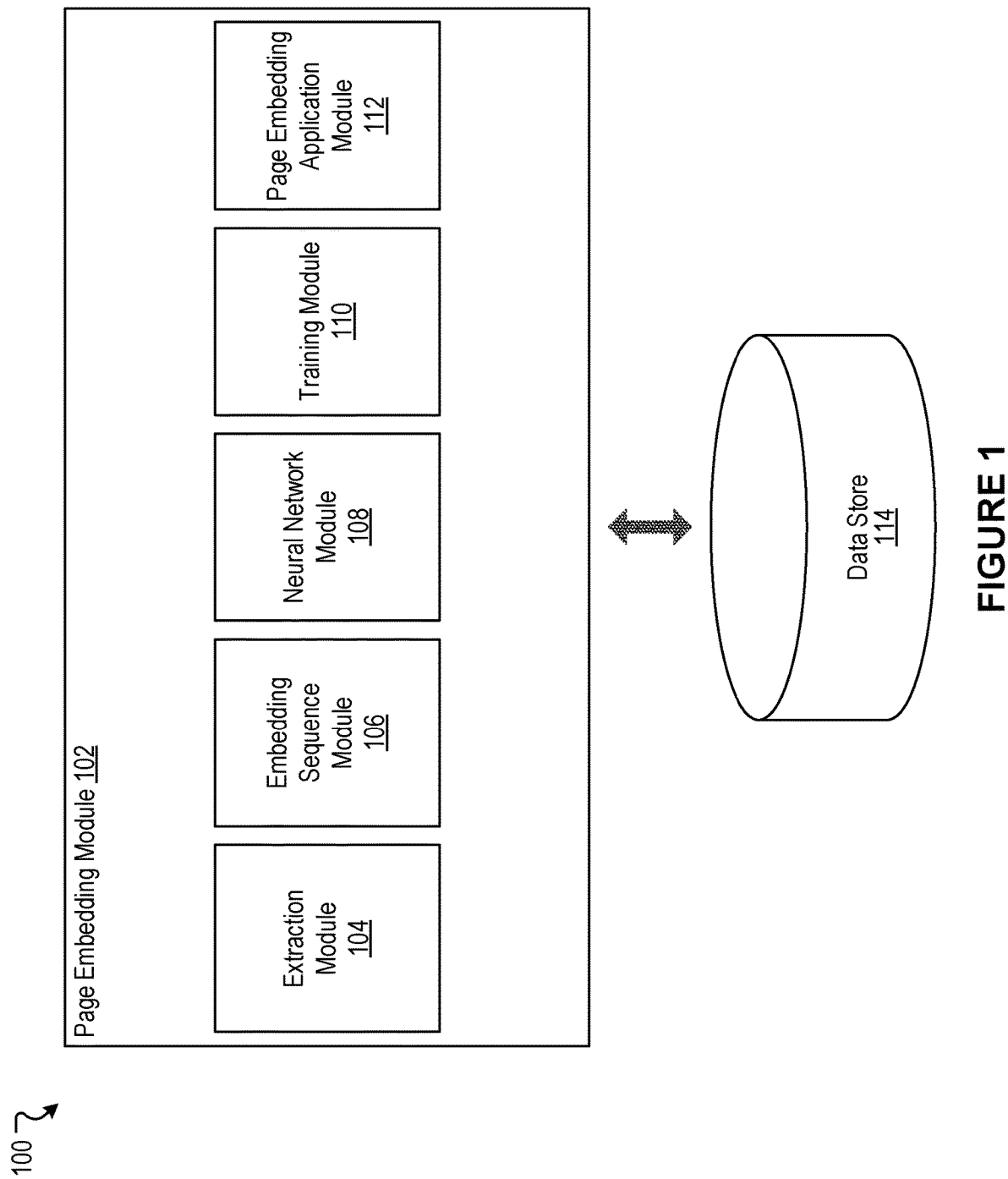
FIG. 1 illustrates an example system including an example page embedding module, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Page Embedding Creation

Users often utilize computing devices for a wide variety of purposes. For example, users of a social networking system can use their computing devices to interact with one another, access content, share content, and create content. The users can also use their computing devices to access pages on the social networking system. The pages can be created by businesses, community organizations, public figures, and other entities. The social networking system can provide a large number of pages for a large number of entities. Accordingly, a user of the social networking system can have many choices in terms of pages to access.

The large number of pages provided by the social networking system can enrich the experience of the user on the social networking system. However, the user can be unsure of which pages to access. As such, the social networking system can provide page recommendations to users. The social networking system can use machine learning models to provide the page recommendations. The machine learning models can accept various inputs. According to some conventional approaches, the inputs can include page embeddings. However, conventional page embeddings typically fail to comprehensively represent various dimensions and attributes of pages. As such, the abilities of the machine learning models to provide effective page recommendations to users can be hampered.

Due to these or other concerns, the aforementioned and other conventional approaches specifically arising in the realm of computer technology can be disadvantageous or problematic. Therefore, an improved approach can be beneficial for addressing or alleviating various drawbacks associated with conventional approaches. Based on computer technology, the present technology can generate a page embedding for a page of a social networking system. The present technology can access a page of the social networking system. Multiple channels can be extracted from the page. The channels can be of various types. Further, embedding sequences can be generated for the channels. A neural network can then detect patterns in the embedding sequences. The neural network can also generate channel embeddings for the channels by performing pooling on the detected patterns. The neural network can also map the channel embeddings to a shared embedding space. Then, the neural network can output a page embedding for the page by performing pooling on the mapped channel embeddings. The page embedding can be used in providing page recommendations. In some embodiments, pattern detection is not performed for certain channel types. Further details regarding the present technology are provided herein.

FIG. 1 illustrates an example system 100 including an example page embedding module 102, according to an embodiment of the present technology. As referenced above, the page embedding module 102 can generate a page embedding for a page on a social networking system. As shown in the example of FIG. 1, the page embedding module 102 can include an extraction module 104, an embedding sequence module 106, a neural network module 108, a training module 110, and a page embedding application module 112. In some instances, the example system 100 can include at least one data store 114. The components (e.g., modules, elements, etc.) shown in this figure and all figures herein are exemplary only, and other implementations can include additional, fewer, integrated, or different components. Some components may not be shown so as not to obscure relevant details. In some embodiments, the page embedding module 102 can be implemented in a system, such as a social networking system. While the present technology may be described herein in connection with a social networking system for illustrative purposes, the present technology can be implemented in any other type of system or environment.

In some embodiments, the page embedding module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the page embedding module 102 can be implemented, in part or in whole, as software running on one or more computing devices or systems. For example, the page embedding module 102 or at least a portion thereof can be implemented using one or more computing devices or systems that include one or more servers, such as network servers or cloud servers. In another example, the page embedding module 102 or at least a portion thereof can be implemented as or within an application (e.g., app), a program, an applet, or an operating system, etc., running on a user computing device or a client computing system, such as a user device 610 of FIG. 6. In some instances, the page embedding module 102 can, in part or in whole, be implemented within or configured to operate in conjunction with a system (or service), such as a social networking system 630 of FIG. 6. The application incorporating or implementing instructions for performing functionality of the page embedding module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that there can be many variations or other possibilities.

The page embedding module 102 can be configured to communicate and/or operate with the at least one data store 114, as shown in the example system 100. The at least one data store 114 can be configured to store and maintain various types of data. For example, the data store 114 can store information used or generated by the page embedding module 102. The information used or generated by the page embedding module 102 can include, for example, channel embedding data, machine learning model persistence data, and page embedding data. In some implementations, the at least one data store 114 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 114 can store information associated with users, such as user identifiers, user information, profile information, user specified settings, content produced or posted by users, and various other types of user data.

The extraction module 104 can access a page on the social networking system. The extraction module 104 can then extract one or more channels from the page. Each channel can be a sequence of tokens, such as words, categories, hashtags, or topics. The channels can be of different channel types. The channel types can include, for example: 1) page name; 2) page description; 3) page categories; 4) page hashtags; and 5) page topics.

The extraction module 104 can extract a channel of channel type page name by retrieving a portion of the page which indicates words constituting a name of the page. The extraction module 104 can extract a channel of channel type page description by retrieving a portion of the page which indicates words constituting a description of the page. Likewise, the extraction module 104 can extract a channel of channel type page categories by retrieving a portion of the page which indicates categories of the page. The one or more categories can have been chosen for the page by an administrator of the page from a pool of possible categories established by the social networking system. The extraction module 104 can extract a channel of channel type page hashtags by, for example, retrieving one or more portions of the page which include images of the page, providing the images to a trained machine learning model to generate hashtags, and receiving one or more hashtags from the machine learning model. The extraction module 104 can extract a channel of channel type page topics by, for example, retrieving one or more portions of the page which include posts of the page, providing the posts to a trained machine learning model to generate topics, and receiving one or more topics from the machine learning model. Alternately or additionally, the extraction module 104 can provide the page name to the machine learning model in order to receive the one or more topics.

The embedding sequence module 106 can access the sequence of tokens of each channel of the page. The embedding sequence module 106 can also generate an embedding sequence for each channel. Each channel can be of one of the discussed channel types. For each channel, the embedding sequence module 106 can access a reference for the channel type of the channel. The reference can indicate, for each of one or more tokens, a corresponding token embedding. The embedding sequence module 106 can use the reference to determine a token embedding for each token of the sequence of tokens of the channel. The embedding sequence module 106 can then replace each token of the sequence of tokens of the channel with its token embedding. As such, the embedding sequence module 106 can generate an embedding sequence for the sequence of tokens of each channel. In some embodiments, the reference for a given channel type does not indicate a corresponding token embedding for certain tokens. In these embodiments, the embedding sequence module 106 can use zero vectors as the token embeddings for these certain tokens when generating an embedding sequence. Also, in some embodiments, where the page lacks a given channel, one or more zero vectors can be used as an embedding sequence for that channel.

The neural network module 108 can access the embedding sequence for each channel. The neural network module 108 can implement a neural network. The neural network can take as input, for each of multiple channels of a page, an embedding sequence. The neural network can subsequently generate a page embedding for the page. Additional details regarding the neural network module 108 are provided below with reference to FIG. 2.

The training module 110 can access instances of training data. The training module 110 can use the training data to provide inputs to the neural network of the neural network module 108. The neural network can provide outputs for the inputs. The training module 110 can use these outputs in setting weights of the neural network. Additional details regarding the training module 110 are provided below with reference to FIG. 3.

The page embedding application module 112 can use the page embedding generated by the neural network module 108 to provide page recommendations to users of the social networking system. In some embodiments, as just one example, the page embedding application module 112 can provide the page embedding to a machine learning model trained to predict the likelihood of a user interacting with a page on a social networking system. In this example, the page embedding application module 112 can further provide to the machine learning model an embedding for a user, or one or more features which describe the user. Further, in this example, the page embedding application module 112 can receive from the machine learning model a likelihood that the user will like or otherwise interact with the page. Where the likelihood satisfies a threshold value, the social networking system can recommend the page to the user. As just another example, the page embedding application module 112 can use a trained machine learning model to map the page embedding to a shared embedding space. The shared embedding space can be an embedding space to which the machine learning model has mapped page embeddings for various other pages. The shared embedding space can further be an embedding space to which the machine learning model has mapped embeddings for various users. In this example, where a page embedding for a page is located within a threshold distance from an embedding for a user within the shared embedding space, the social networking system can recommend the page to the user. Many variations are possible.

Figure 2:
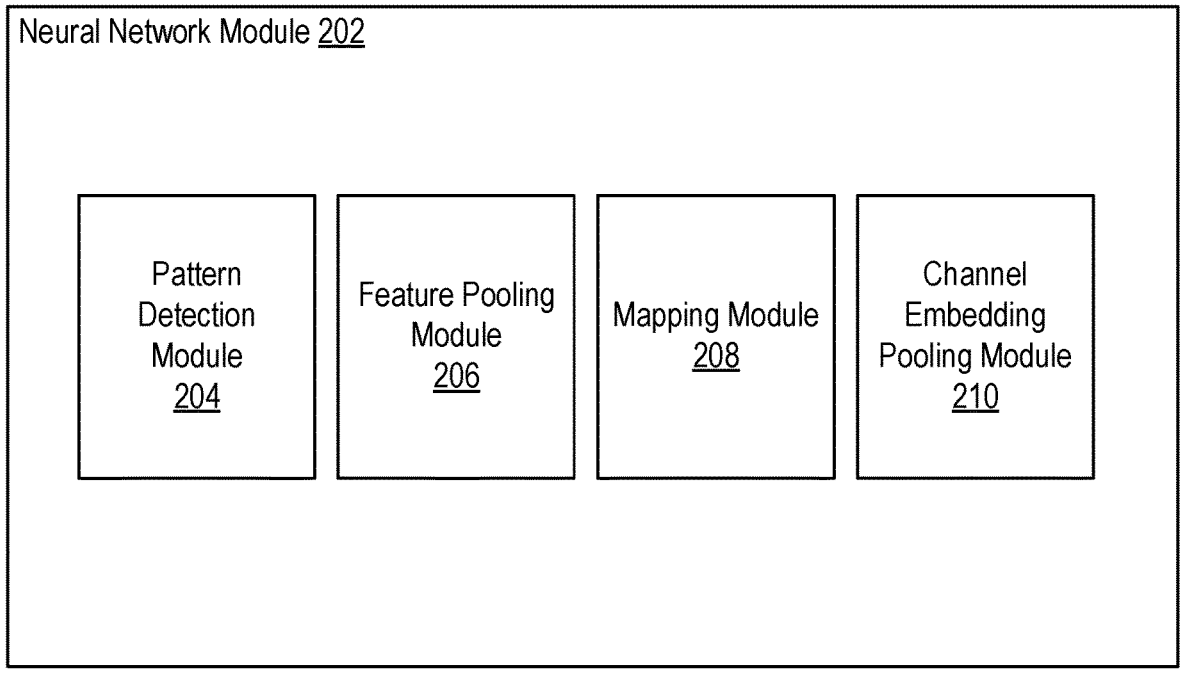
FIG. 2 illustrates an example neural network module, according to an embodiment of the present technology.

FIG. 2 illustrates an example neural network module 202, according to an embodiment of the present technology. In some embodiments, the neural network module 108 of FIG. 1 can be implemented as the example neural network module 202. The neural network module 202 can implement or otherwise support a neural network. As shown in FIG. 2, the neural network module 202 can include a pattern detection module 204, a feature pooling module 206, a mapping module 208, and a channel embedding pooling module 210. In some embodiments, the neural network discussed in connection with the neural network module 202 can be implemented as one or multiple neural networks.

The pattern detection module 204 can access an embedding sequence for each of one or more channels of a page. For each of the one or more channels, the pattern detection module 204 can then output a result of a pattern detection operation as features for the channel. The pattern detection operation can be an application of a group of convolutional layers of the neural network to the embedding sequence for the channel. A group of convolutional layers can be associated with each of the one or more channels. In some embodiments, pattern detection is not performed for one or more channels of the page, as discussed in greater detail below. In these embodiments, where pattern detection is not performed for a channel, a group of convolutional layers is not associated with the channel.

The feature pooling module 206 can access the outputs of the pattern detection module 204. As such, the feature pooling module 206 can access outputted features for one or more channels of the page. The feature pooling module 206 can next generate a channel embedding for each of the one or more channels. In particular, the feature pooling module 206 can generate the channel embeddings by performing, for each of the one or more channels, a pooling operation. The pooling operation can be an application of a pooling layer of the neural network to the features for that channel. As examples, the pooling layer can implement average pooling or max pooling. A pooling layer can be associated with each of the channels.

As noted, in some embodiments pattern detection is not performed for one or more channels of the page. In these embodiments, where pattern detection is not performed for a channel of the page, the feature pooling module 206 can access an embedding sequence for the channel. The feature pooling module 206 can then use the embedding sequence for the channel as features for the channel. As such, the feature pooling module 206 can generate a channel embedding for the channel by applying a pooling layer of the neural network to the embedding sequence for the channel. In some embodiments, pattern detection can be performed for channels of the page which are of one or more first channel types. In these embodiments, pattern detection is not performed for channels of the page which are of one or more second channel types. As examples, the first channel types can include: 1) page name; and 2) page description. Further, as examples, the second channel types can include: 1) page categories; 2) page hashtags; and 3) page topics. Other combinations of the channel types as the first channel types and the second channel types are possible.

The mapping module 208 can access the channel embeddings generated by the feature pooling module 206 for the channels. The mapping module 208 can also map each of the channel embeddings to a shared embedding space. The shared embedding space can be an embedding space to which channel embeddings for multiple channels of multiple pages can be mapped. The mapping module 208 can generate a mapped channel embedding for each of the channel embeddings. In some embodiments, the mapped channel embeddings can all be of the same length. The mapping module 208 can perform the mapping by applying a group of fully-connected layers of the neural network to each of the channel embeddings. A group of fully connected layers can be associated with each of the channels.

The channel embedding pooling module 210 can access the mapped channel embeddings generated by the mapping module 208. The channel embedding pooling module 210 can also produce a single page embedding for the page. In particular, the channel embedding pooling module 210 can produce the page embedding by performing a pooling operation. The pooling operation can be an application of a pooling layer of the neural network to the mapped channel embeddings. The pooling layer can, as examples, implement average pooling or max pooling.

Figure 3:
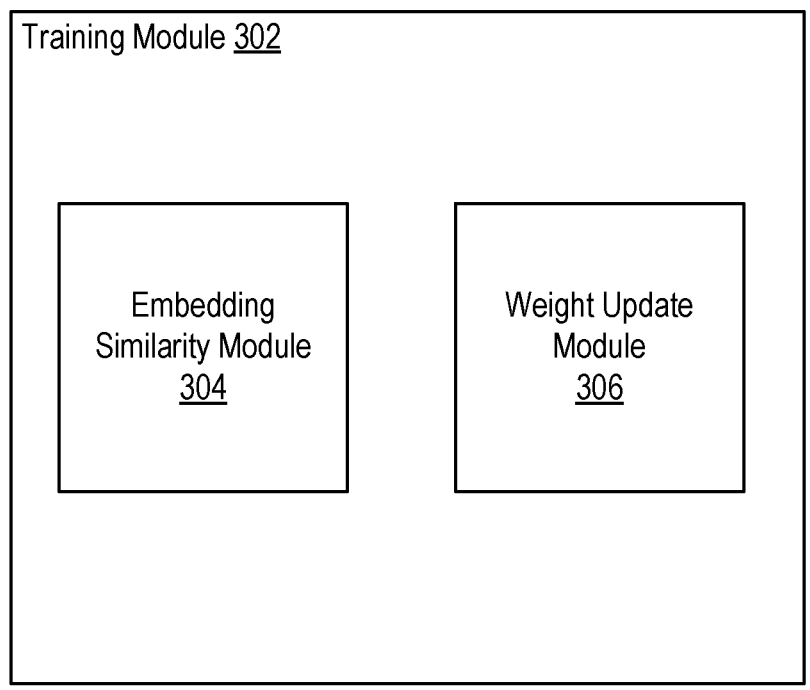
FIG. 3 illustrates an example training module, according to an embodiment of the present technology.

FIG. 3 illustrates an example training module 302, according to an embodiment of the present technology. In some embodiments, the training module 110 of FIG. 1 can be implemented as the example training module 302. As shown in FIG. 3, the training module 302 can include an embedding similarity module 304 and a weight update module 306.

The embedding similarity module 304 can access instances of training data. In some embodiments, each instance of training data can specify, for example, three pages of the social networking system. A first of the three pages can be a given page of the social networking system. A second of the three pages can be a page which is related to the given page. In particular, the second of the three pages can be a page is which is liked by users of the social networking system who also liked the given page. A third of the three pages can be a randomly-selected page of the social networking system. Many variations are possible.

For each instance of training data, the embedding similarity module 304 can use the extraction module 104, the embedding sequence module 106 and the neural network module 108. In particular the embedding similarity module 304 can use these three modules to output a page embedding for each of the three pages of the instance. Also for each instance of training data, the embedding similarity module 304 can calculate two similarity values. A first of the two similarity values can characterize a similarity between: 1) the page embedding for the given page of the instance; and 2) the page embedding for the related page of the instance. A second of the two similarity values can characterize a similarity between: 1) the page embedding for the given page of the instance; and 2) the page embedding for the randomly-selected page of the instance. In some embodiments, the embedding similarity module 304 can calculate the two similarity values as cosine similarities.

The weight update module 306 can access the two similarity values calculated by the embedding similarity module 304 for the instance of training data. Further, the weight update module 306 can calculate a loss value from the two similarity values. The loss value can be inversely related to the first of the two similarity values. Accordingly, for instance, where the page embedding for the given page and the page embedding for the related page are more alike, the loss value can be lower. Moreover, the loss value can be directly related the second of the two similarity values. Accordingly, for instance, where the page embedding for the given page and the page embedding for the randomly-selected page are more alike, the loss value can be higher. The weight update module 306 can calculate the loss value as, for example, a square norm loss or as a margin ranking loss. Further, the weight update module 306 can set weights of the neural network associated with the neural network module 108. In particular, the weight update module 306 can set the weights of the neural network to result in a lower loss value.

Figure 4:
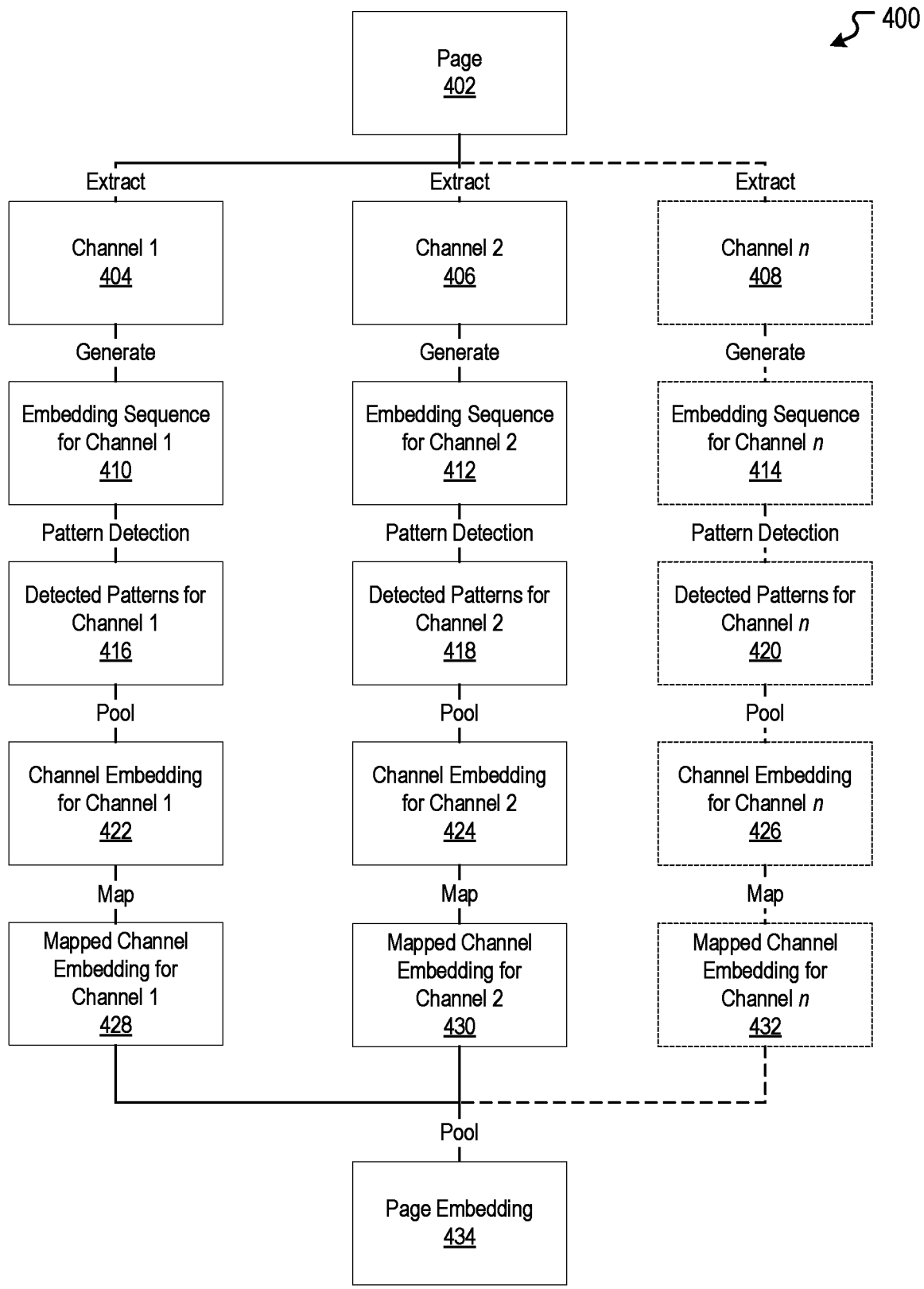
FIG. 4 illustrates an example functional block diagram, according to an embodiment of the present technology.

FIG. 4 illustrates an example functional block diagram 400, according to an embodiment of the present technology. The functional block diagram 400 illustrates an example of operation of the page embedding module 102, as discussed in further detail above. A page 402 of the social networking system can be accessed. Further, multiple channels of the page 402 can be extracted. The multiple channels can include a channel 1 404, a channel 2 406, and a channel n 408. Embedding sequences can be generated for each of the multiple channels. The embedding sequences can include an embedding sequence for channel 1 410, an embedding sequence for channel 2 412, and an embedding sequence for channel n 414. Pattern detection operations can be performed on the embedding sequences. The pattern detection operations can be performed using convolutional layers of a neural network. The pattern detection operations can result in detected patterns for each of the multiple channels. The detected patterns can include detected patterns for channel 1 416, detected patterns for channel 2 418, and detected patterns for channel n 420. Further, channel embeddings can be generated for each of the multiple channels. In particular, the channel embeddings can be generated by performing pooling operations on each of the detected patterns. The pooling operations can be performed using pooling layers of the neural network. The channel embeddings which are generated by the pooling operations can include channel embedding for channel 1 422, channel embedding for channel 2 424, and channel embedding for channel n 426. In some embodiments, pattern detection is not performed for one or more of the channels. In these embodiments, where pattern detection is not performed for a channel, an embedding for the channel can be generated by performing a pooling operation on the embedding sequence for the channel.

The channel embeddings can be mapped to a shared embedding space. As such, a mapped channel embedding can be generated from each of the channel embeddings. The mapping can be performed using fully connected layers of the neural network. The mapped channel embeddings can include mapped channel embedding for channel 1 428, mapped embedding for channel 2 430, and mapped channel embedding for channel n 432. Further, a single page embedding 434 can be produced for the page 402 by performing a pooling operation on the mapped channel embeddings. The pooling operation can be performed using a pooling layer of the neural network. The page embedding 434 can subsequently be used in providing page recommendations to users of the social networking system.

Figure 5:
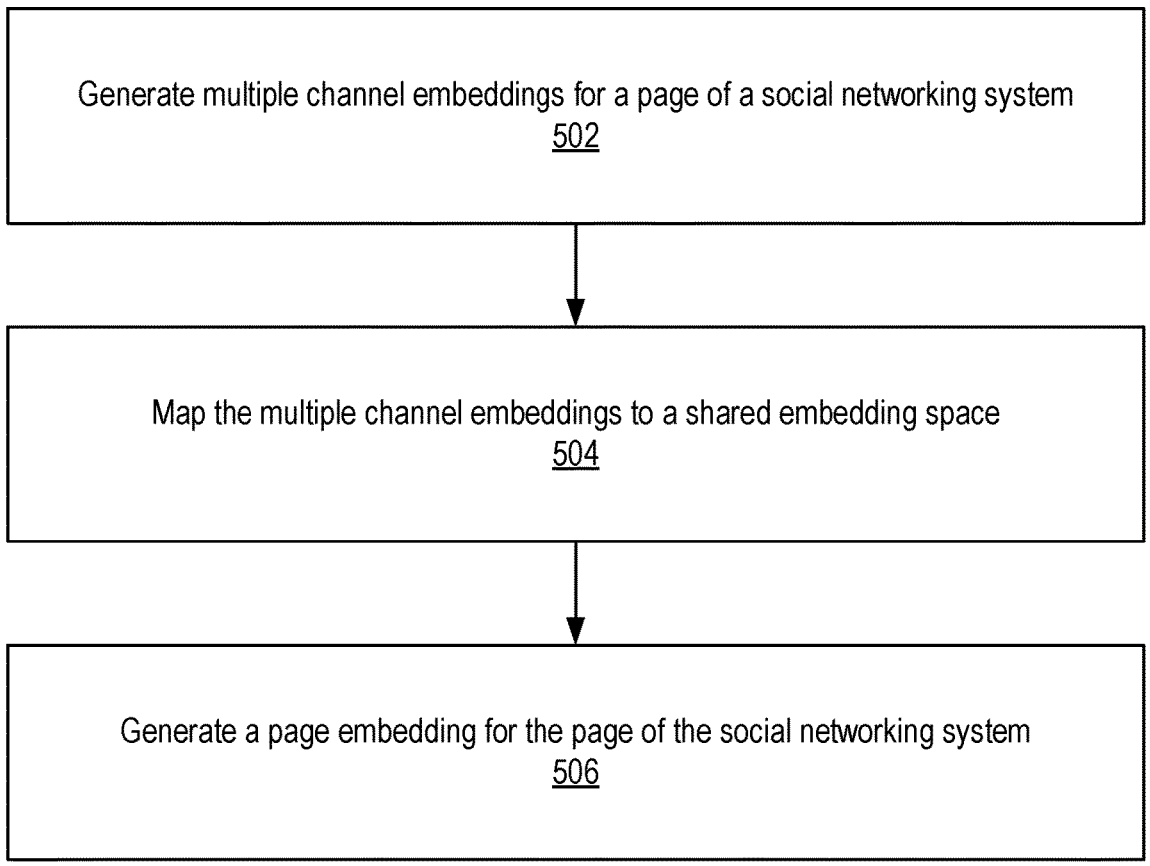
FIG. 5 illustrates an example process, according to an embodiment of the present technology.

FIG. 5 illustrates an example process 500, according to various embodiments of the present technology. It should be appreciated that there can be additional, fewer, or alternative steps performed in similar or alternative orders, or in parallel, within the scope of the various embodiments discussed herein unless otherwise stated.

At block 502, the example process 500 can generate multiple channel embeddings for a page of a social networking system. At block 504, the process can map the multiple channel embeddings to a shared embedding space. Then, at block 506, the process can generate a page embedding for the page of the social networking system.

It is contemplated that there can be many other uses, applications, and/or variations associated with the various embodiments of the present technology. For example, in some cases, user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
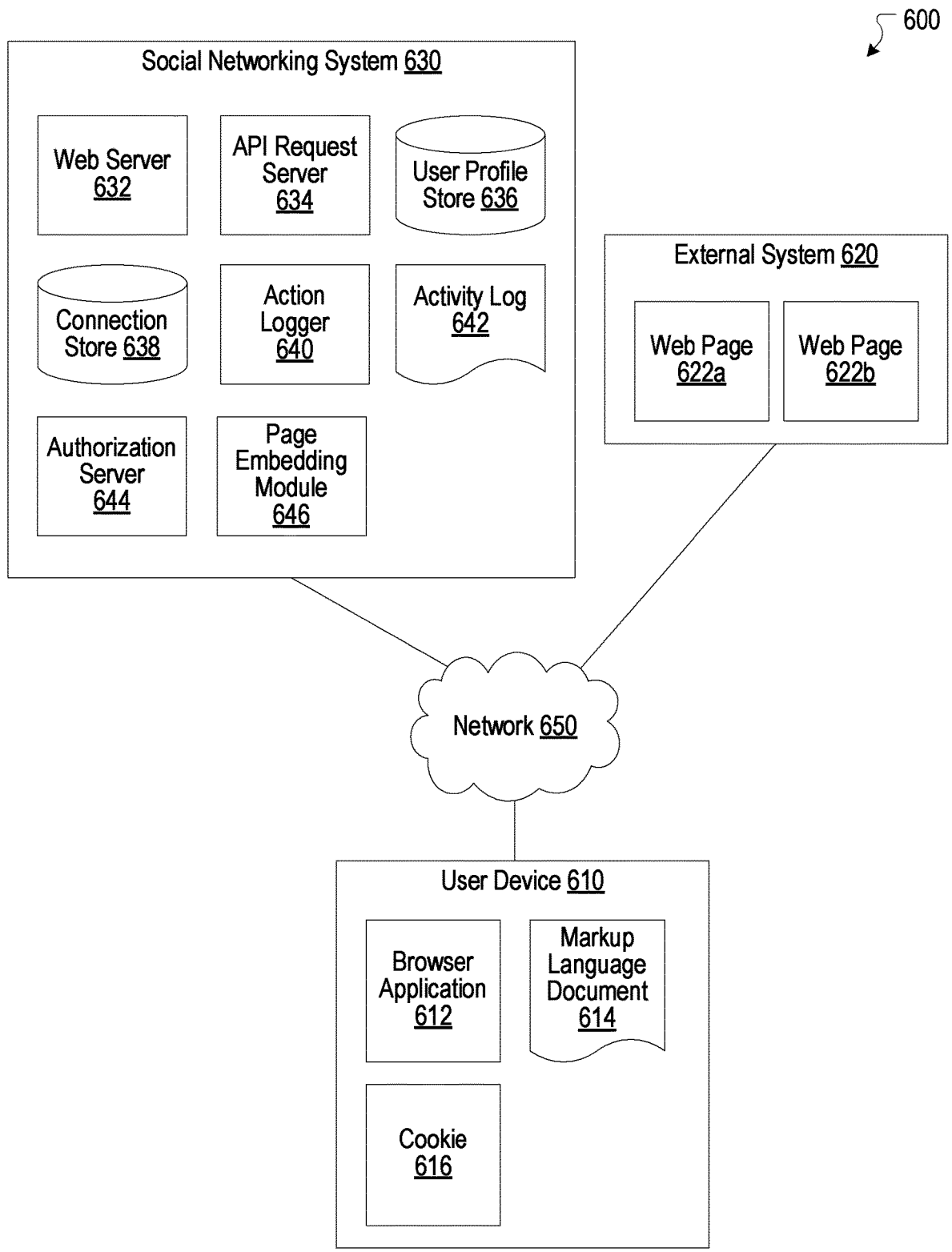
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects an other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page embedding module 646. The page embedding module 646 can, for example, be implemented as the page embedding module 102 of FIG. 1. In some embodiments, some or all of the functionality and modules of the page embedding module 646 instead can be implemented in the user device 610.

Hardware Implementation

Figure 7:
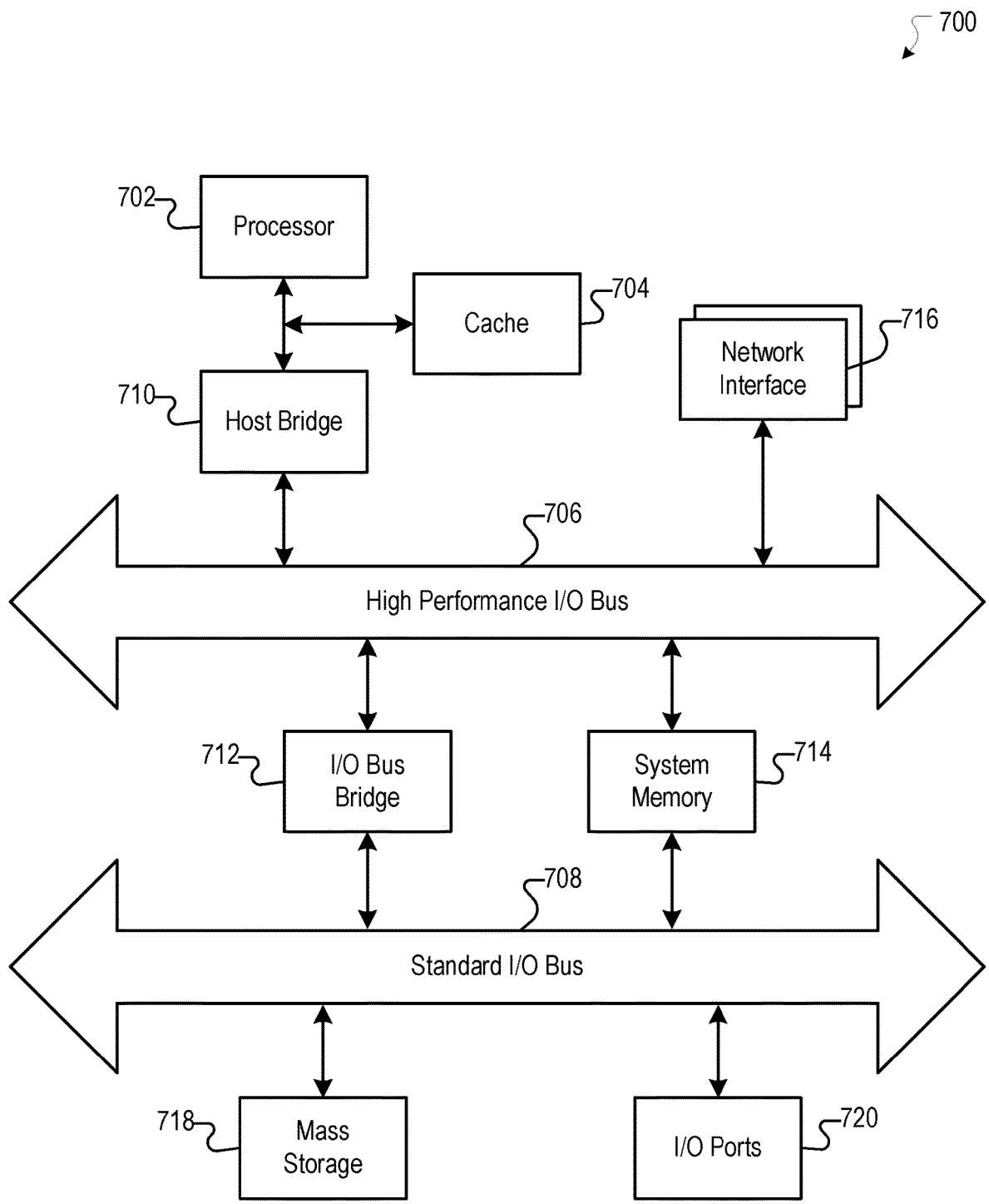
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs));

other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the embodiments of the invention are intended to be illustrative, but not limiting, of the scope of the invention, which is set forth in the following claims.

What is claimed is:

1. A computer-implemented method comprising:
   generating, by a computing system, a plurality of embedding sequences for a page based at least in part on sequences of tokens corresponding to a plurality of channel types, wherein the plurality of channel types includes a page hashtag channel type, and the tokens corresponding to the page hashtag channel type include hashtags generated from images on the page;
   generating, by the computing system, a plurality of channel embeddings associated with a plurality of channels on the page corresponding to the plurality of channel types, wherein a channel embedding of the plurality of channel embeddings is based at least in part on a first pooling of a corresponding embedding sequence of the plurality of embedding sequences;
   mapping, by the computing system, the plurality of channel embeddings to a shared embedding space;
   generating, by the computing system, a page embedding for the page based at least in part on a second pooling of the plurality of channel embeddings;
   determining, by the computing system, a loss value that is related to a first similarity value between the page embedding and a random page embedding of a random page and that is inversely related to a second similarity value between the page embedding and a related page embedding of a related page, wherein weights associated with at least one of the generating the plurality of embedding sequences, the generating the plurality of channel embeddings, or the generating the page embeddings are updated based on the loss value; and
   determining, by the computing system, a likelihood a user will interact with the page based at least in part on the page embedding and a user embedding for the user.

2. The computer-implemented method of claim 1, wherein an embedding sequence of the plurality of embedding sequences is a zero vector based at least in part on a lack of a channel of a channel type corresponding to the embedding sequence on the page.

3. The computer-implemented method of claim 1, further comprising:
   detecting, by the computing system, patterns in an embedding sequence of the plurality of embedding sequences.

4. The computer-implemented method of claim 3, wherein the detecting the patterns in the embedding sequence of the plurality of embeddings sequences comprises:
   applying, by the computing system, a group of convolutional layers of a neural network to the embedding sequence of the plurality of embedding sequences, wherein the group of convolutional layers is associated with a channel of the plurality of channels.

5. The computer-implemented method of claim 1, wherein the plurality of channel types further includes at least one of: page name, page description, page categories, or page topics.

6. The computer-implemented method of claim 1, wherein pattern detection is performed for at least one channel type of the plurality of channel types and the pattern detection is not performed for other channel types of the plurality of channel types.

7. The computer-implemented method of claim 1, wherein the mapping the plurality of channel embeddings to the shared embedding space comprises:
   applying, by the computing system, fully-connected layers of a neural network.

8. The computer-implemented method of claim 1, wherein the second pooling of the plurality of channel embeddings is based at least in part on an average pooling or a max pooling of the plurality of channel embeddings.

9. The computer-implemented method of claim 1, wherein the loss value is determined based on a square norm loss or a margin ranking loss.

10. The computer-implemented method of claim 1, wherein the first similarity value and the second similarity value are based on cosine similarities.

11. A system comprising:
    at least one processor; and
    a memory storing instructions that, when executed by the at least one processor, cause the system to perform:
       generating a plurality of embedding sequences for a page based at least in part on sequences of tokens corresponding to a plurality of channel types, wherein the plurality of channel types includes a page hashtag channel type, and the tokens corresponding to the page hashtag channel type include hashtags generated from images on the page;

generating a plurality of channel embeddings associated with a plurality of channels on the page corresponding to the plurality of channel types, wherein a channel embedding of the plurality of channel embeddings is based at least in part on a first pooling of a corresponding embedding sequence of the plurality of embedding sequences;

mapping the plurality of channel embeddings to a shared embedding space;

generating a page embedding for the page based at least in part on a second pooling of the plurality of channel embeddings;

determining a loss value that is related to a first similarity value between the page embedding and a random page embedding of a random page and that is inversely related to a second similarity value between the page embedding and a related page embedding of a related page, wherein weights associated with at least one of the generating the plurality of embedding sequences, the generating the plurality of channel embeddings, or the generating the page embeddings are updated based on the loss value; and determining a likelihood a user will interact with the page based at least in part on the page embedding and a user embedding for the user.

12. The system of claim 11, wherein the instructions, when executed by the at least one processor, further cause the system to perform:

extracting a plurality of channels from the page.

13. The system of claim 12, wherein the plurality of channel types further include one or more of: page name, page description, page categories, or page topics.

14. The system of claim 12, wherein the extracting the plurality of channels from the page of the social networking system comprises:

providing, to a machine learning model, the images on the page; and receiving, from the machine learning model, the hashtags.

15. The system of claim 12, wherein the extracting the plurality of channels from the page of the social networking system comprises:

providing, to a machine learning model, posts from the page; and receiving, from the machine learning model, topics.

16. A non-transitory computer-readable storage medium including instructions that, when executed by at least one processor of a computing system, cause the computing system to perform:

generating a plurality of embedding sequences for a page based at least in part on sequences of tokens corresponding to a plurality of channel types, wherein the plurality of channel types includes a page hashtag channel type, and the tokens corresponding to the page hashtag channel type include hashtags generated from images on the page;

generating a plurality of channel embeddings associated with a plurality of channels on the page corresponding to the plurality of channel types, wherein a channel embedding of the plurality of channel embeddings is based at least in part on a first pooling of a corresponding embedding sequence of the plurality of embedding sequences;

mapping the plurality of channel embeddings to a shared embedding space;

generating a page embedding for the page based at least in part on a second pooling of the plurality of channel embeddings;

determining a loss value that is related to a first similarity value between the page embedding and a random page embedding of a random page and that is inversely related to a second similarity value between the page embedding and a related page embedding of a related page, wherein weights associated with at least one of the generating the plurality of embedding sequences, the generating the plurality of channel embeddings, or the generating the page embeddings are updated based on the loss value; and determining a likelihood a user will interact with the page based at least in part on the page embedding and a user embedding for the user.

17. The non-transitory computer-readable storage medium of claim 16, wherein the instructions, when executed by the at least one processor of the computing system, further cause the computing system to perform:

accessing an instance of training data, wherein the instance of training data specifies a first page, a second page, and a third page.

18. The non-transitory computer-readable storage medium of claim 17, wherein the second page is liked by users who liked the first page.

19. The non-transitory computer-readable storage medium of claim 18, wherein the instructions, when executed by the at least one processor of the computing system, further cause the computing system to perform:

determining a training similarity value for:

a first page embedding of the first page; and a second page embedding of the second page.

20. The non-transitory computer-readable storage medium of claim 17, wherein the instructions, when executed by the at least one processor of the computing system, further cause the computing system to perform:

determining a training similarity value for:

a first page embedding of the first page; and a third page embedding of the third page, wherein the third page is a randomly-selected page.

* * * * *